United States Patent [19]

Brower et al.

[11] Patent Number: 4,664,622

[45] Date of Patent: May 12, 1987

[54] MULTILAMP PHOTOFLASH DEVICE WITH IMPROVED COATING

[75] Inventors: Boyd G. Brower; John W. Shaffer, both of Williamsport, Pa.

[73] Assignee: GTE Products Corporation, Danvers, Mass.

[21] Appl. No.: 857,686

[22] Filed: Apr. 30, 1986

[51] Int. Cl.$^4$ .............................................. F21K 5/02
[52] U.S. Cl. ..................................... 431/360; 431/359
[58] Field of Search ....................... 431/357, 359, 360; 313/110–117; 362/11–18

[56] References Cited

U.S. PATENT DOCUMENTS

| | | | |
|---|---|---|---|
| 3,060,710 | 10/1962 | Bennett | 431/360 |
| 3,873,260 | 3/1975 | Cote | 431/362 |
| 3,941,992 | 3/1976 | Blount et al. | 431/359 X |
| 3,969,065 | 7/1976 | Smialek | 431/359 |
| 4,049,369 | 9/1977 | Shaffer | 431/362 |
| 4,101,260 | 7/1978 | Wanninkhof et al. | 431/360 X |
| 4,174,944 | 11/1979 | Newell et al. | 431/360 X |

*Primary Examiner*—Margaret A. Focarino
*Attorney, Agent, or Firm*—Martha Ann Finnegan

[57] ABSTRACT

A multilamp photoflash device comprising an outer housing containing a plurality of flashlamps and means for sequentially flashing the flashlamps of the device and having an antistatic coating on the surface of the outer housing is provided. The antistatic coating comprises an anionic surfactant and a deliquescent salt. A method for inhibiting electrostatic charge buildup in a multilamp photoflash device comprising an outer housing containing a plurality of flashlamps and means for sequentially flashing the flashlamps of the device is also provided. The method includes applying an antistat solution comprising an anionic surfactant and a deliquescent salt dissolved in a solvent to the surface of the outer housing of the multilamp photoflash device and evaporating the solvent from the antistat solution on the surface of the outer housing so as to form an antistatic coating thereon. The coating comprises the anionic surfactant and deliquescent salt components of the antistat solution.

24 Claims, No Drawings

MULTILAMP PHOTOFLASH DEVICE WITH IMPROVED COATING

BACKGROUND OF THE INVENTION

This invention relates to multilamp photoflash devices, and more particularly to multilamp photoflash devices with an improved antistatic coating.

The photoflash industry has long been plagued by premature electrostatic flashing of the flashlamps within multilamp photoflash products. Causes of such premature flashing include environmental charges caused by rubbing of the array over nonconductive surfaces. Premature flashing represents product loss to the consumer as well as a potential for causing damage to varnished surfaces of furniture, etc. upon which the photoflash product could be laying at the time of the undesired flashing.

Until the present time, anionic surfactants or quaternary ammonium-type cationic surfactants have been used to help protect flashlamps from accumulating charge due to friction or contact with dissimilar materials. These surfactants are more commonly referred to in the photoflash industry as "antistats". Antistats are applied to either the lamp envelope or the exterior surface of the outer housing of the array itself, usually by applying a dilute solution of the antistat to the surface of the part being coated.

Although the application of a surfactant to the outer surface of the lamp or outer housing reduces the frequency of premature flashing due to the electrostatic charge from handling the array, premature flashing of flashlamps in multilamp photoflash arrays does still occur. In multilamp photoflash arrays containing nonmetallized reflectors (e.g., non-metallic reflectors), premature flashing of flashlamps remains a significant problem even after a surfactant has been applied to the outer surface of the housing for the arrays.

SUMMARY OF THE INVENTION

In accordance with one aspect of the present invention, there is provided a multilamp photoflash device comprising an outer housing containing a plurality of flashlamps and means for sequentially flashing the flashlamps of the device; and an antistatic coating on the surface of the outer housing, said coating comprising an anionic surfactant and a deliquescent salt.

In accordance with another aspect of the present invention there is provided a method for inhibiting electrostatic charge buildup in a multilamp photoflash device comprising an outer housing containing a plurality of flashlamps and means for sequentially flashing the flashlamps of the device, the method comprising applying an antistat solution comprising an anionic surfactant and a deliquescent salt dissolved in a solvent to the surface of the outer housing of the multilamp photoflash device; and evaporating the solvent from the antistat solution on the surface of the outer housing so as to form an antistatic coating thereon, the coating comprising the anionic surfactant and deliquescent salt components of the antistat solution.

For a better understanding of the present invention together with other and further objects, advantages, and capabilities thereof, reference is made to the following disclosure and appended claims.

DETAILED DESCRIPTION OF THE INVENTION

A multilamp photoflash device in accordance with the present invention includes an outer housing which contains a plurality of flashlamps and a means for sequentially flashing the flashlamps of the device which are connected thereto or associated therewith. The surface of the outer housing of the array of the present invention has an improved antistatic coating thereon. The antistatic coating comprises an anionic surfactant and a deliquescent salt. The use of an antistatic coating, comprising a surfactant and a deliquescent salt, prevents premature flashing of flashlamps of the array due to electrostatic charge build-up to a greater extent than if the array were coated with only a surfactant. The array may further include a means for connectably engaging the photoflash array to a camera or other device for applying firing voltage pulses to the array.

The improvement in electrostatic protection provided by the present invention is attained in both multilamp photoflash devices containing metallized reflectors and in multilamp photoflash devices containing no metallized reflectors. The improvement in electrostatic protection, however, is most significant in photoflash devices in accordance with the present invention containing no metallized reflectors. The electrostatic charge problem due to environmental charges and/or handling is more severe in photoflash devices containing no metallized reflectors because such devices do not possess the electrostatic protection afforded by the presence of metallized, or conductive, reflector parts. Metallized, or conductive, reflectors are excluded from photoflash array devices for such reasons as reducing the cost of the photoflash device, and/or facilitating production of miniaturized photoflash devices.

The improvement in electrostatic protection provided by the present invention is still further enhanced in a preferred embodiment wherein both the surface of the outer housing of the device and the exterior surface of the flashlamp envelope of at least one flashlamp of the device are coated with the improved antistatic coating comprising an anionic surfactant and a deliquescent salt. Most preferably, each of the flashlamps of the device has an antistatic coating thereon.

The particular configuration of multilamp photoflash devices in accordance with the present invention is not critical, i.e., the device can have a cube or other array configuration. For example, a multilamp photoflash device in accordance with the present invention can have a flashcube configuration, such as described in U.S. Pat. No. 3,244,087 issued to Anderson et al. on Apr. 5, 1966 and U.S. Pat. No. 3,327,105 issued to Kotter et al. on June 20, 1967, which patents are hereby incorporated herein by reference, or a magicube configuration such as described in U.S. Pat. No. 3,730,669 issued to Shaffer on May 1, 1973 which is hereby incorporated herein by reference. Alternatively, a multilamp photoflash device, in accordance with the present invention can have a flash bar configuration, such as that described in U.S. Pat. No. 3,857,667 issued to Vetere et al. on Dec. 31, 1974 which is hereby incorporated herein by reference. In the foregoing configurations, a plurality of flashlamps and associated reflectors are mounted on a relatively horizontal base member and enclosed in a cubical or rectangular parallelopiped-shaped transparent outer housing, or cover member, which is joined to the periphery of the base section by means of heat or sonic sealing techniques. In the case of the flash bar, which is a bi-directional linear array, the flashlamps are connected to a printed circuit board which is held in the separate base member.

An example of a further alternative configuration for a multilamp photoflash device in accordance with the present invention is a unidirectional linear flash array, such as that described in U.S. Pat. No. 3,473,880 issued to Wick on Oct. 21, 1969 which is hereby incorporated herein by reference. In this array, the flashlamps are connected to a printed circuit board which comprises the rear housing of the unit and includes reflector cavities. A separate transparent sheet is then secured to the front of the unit to enclose the flashlamps. Circuit patterns and terminals are disposed on both sides of this rear housing member, and one of the lamp lead-in wires passes through an aperture in the rear housing reflector cavity for connection to a circuit pattern on the rear side of the housing. A somewhat similar type of housing structure is also shown in U.S. Pat. No. 3,430,545 issued to Wick on Mar. 4, 1969.

A multilamp photoflash device in accordance with the present invention can also have a planar photoflash array configuration such as that illustrated in U.S. Pat. No. 3,894,226 issued to Hanson on July 8, 1975 and U.S. Pat. No. 4,017,728 issued to Audesse et al. on Apr. 12, 1977, which patents are hereby incorporated herein by reference. The overall construction of this planar array, which is more commonly referred to as a flipflash, comprises an outer housing having front and back plastic housing members with interlocking means for providing a unitary structure. The front housing member is a rectangular concavity, and the back housing is substantially flat. Sandwiched between the front and back housing members, in the order named, are a plurality of flashlamps, a multicavity reflector member, an insulating sheet, a printed circuit board having conductive patterns on one side to which the flashlamps are connected, and an indicia sheet. A similar planar array in which additional flashlamps are packaged in the same volume is described in U.S. Pat. Nos. 4,156,269 issued to Armstrong on May 22, 1979 and 4,164,007 issued to Audesse et al. on Aug. 7, 1979, which are hereby incorporated herein by reference.

An additional configuration for a photoflash device in accordance with the present invention is one which employs lamp-reflector units in linear rows facing in opposite directions, such as described in U.S. Pat. No. 3,598,984 issued to Slomski on Aug. 10, 1971, U.S. Pat. No. 3,598,985 issued to Harnden et al. on Aug. 10, 1971, and U.S. Pat. No. 4,032,769 issued to Hartman et al. on June 28, 1977 which are hereby incorporated herein by reference. For example, the housing for the flash embodiments shown in U.S. Pat. No. 3,598,985 comprise a base section and a separate transparent cover section, similar to that described above with respect to the flash bar.

An example of still another configuration for the multilamp photoflash array of the present invention is shown in U.S. Pat. No. 4,326,241 issued to Broadt et al. on Apr. 20, 1982, which is hereby incorporated herein by reference. Such photoflash device comprises a horizontal linear array of flashlamps enclosed within a one piece housing member having a light-transmitting front portion folded over a back portion containing a plurality of lamp-receiving cavities in which respective flashlamps are disposed. The housing is a formed sheet of plastic film having a linear fold disposed horizontally along the top of the array of cavities, which are selectively aluminized to provide a reflective coating on the cavity surface. A pair of lead-in wires from each of the flashlamps are connected to conductive circuit patterns on one side of a printed circuited board sandwiched between a set of tabs which run along the bottom of the front and back portions of the housing and are secured together. The sides of the housing are also secured so that the flashlamps, lead-in wires and connections are disposed within a secured enclosure with a plurality of conductive connector terminals being disposed on a tab which projects from the printed circuit board and extends exteriorly of the secured enclosure.

A still further example of a configuration for a photoflash array in accordance with the present invention is such as that shown in FIG. 1 of U.S. Pat. No. 4,581,682 issued to Shaffer on Apr. 8, 1986 which patent is hereby incorporated herein by reference. FIG. 1 of U.S. Pat. No. 4,581,682 is an exploded view of miniaturized multilamp photoflash array including a base member formed to receive a circuit board, a circuit board having a printed circuit on one surface thereof and affixed to the base member; a plurality of flashlamps in parallel alignment and affixed to the circuit board, and a transparent plastic cover member affixed to the base member and enclosing the circuit board and flashlamps therebetween. The configuration used in the present invention preferably includes at least one prismatic barrier divider extending outwardly from the cover member toward the circuit board and intermediate a pair of flashlamps, as illustrated in FIG. 3 of U.S. Pat. No. 4,581,682. Although, the configuration used in the present invention could optionally exclude such prismatic barrier dividers. A miniaturized multilamp photoflash device, such as that described in U.S. Pat. No. 4,581,682, contains no aluminized reflector.

As can be seen in the above-described configurations, the outer housing of a multilamp photoflash device can comprise a single piece, or member, or it can comprise more than one piece, or member. The outer housing or multilamp photoflash devices are typically fabricated from electrically insulating materials, e.g., plastics, such as polyvinyl chloride, polycarbonate, polystyrene, and butadiene-styrene copolymer. Such materials, when untreated, have a very high resistance. A surface resistance of less than about four hundred megohms between points on the outer housing ⅜ inch apart is sufficient to prevent static buildup on the array housing due to contact or rubbing of the array with dissimilar materials. Surfactants alone are inadequate to achieve such surface resistance between points on the housing ⅜ inch apart. However, when the exterior surface of the outer housing of a multilamp photoflash device is coated, in accordance with the present invention, with an antistatic coating comprising an anionic surfactant and a deliquescent salt, the buildup of electrostatic charges due to contact or rubbing with dissimilar materials is minimized.

The antistatic coating applied to the outer housing of a multilamp photoflash device in accordance with the present invention greatly increases the electrical conductivity of the treated exterior surface of the outer housing. The presence of the deliquescent salt in the coating contributes electrical conductivity to the treated surface through the ionic nature of the salt. The deliquescent salt also act as an humectant to increase the amount of atmospheric moisture absorbed into the film. The antistatic coating further increases the conductivity of the device when the antistatic coating is also applied to the surfaces of the flashlamps of the device, in accordance with a preferred embodiment of the present invention.

As used herein, a deliquescent salt is a salt the crystals of which undergo gradual liquefaction by absorption of atmospheric moisture. Examples of such deliquescent salts include: alkaline earth perchlorates, such as magnesium perchlorate and calcium perchlorate; alkaline earth halides, such as magnesium chloride, magnesium bromide, magnesium iodide, calcium chloride, calcium bromide, and calcium iodide; alkaline earth nitrates, such as magnesium nitrate; alkali metal perchlorates, such as sodium perchlorate; and alkali metal formates, such as sodium formate. Mixtures of deliquescent salts can also be used. Preferred deliquescent salts for use in the antistatic coating of the present invention include the alkaline earth halides and the alkaline earth perchlorates. The most preferred deliquescent salts are magnesium perchlorate and magnesium chloride.

The surfactant used in the antistatic coating is of an anionic type. Examples of anionic surfactants include sodium lauryl sulfate, ammonium lauryl sulfates, sodium stearate, sodium tetradecyl sulfate, and sodium polyoxyl ethylene alkylphenol sulfonate. The anionic surfactant can also be a commercially available anionic surfactant which typically further includes modifiers such as, amides, alcohols, ammonium salts, and water. The most preferred commercially available anionic surfactant is Orvus K Liquid, a product manufactured by Proctor and Gamble, Industrial Cleaning Products Division, P.O. Box 599, Cincinnati, Ohio 45201. Orvus K Liquid is a highly concentrated neutral, anionic synthetic detergent whose active ingredient is a ammonium lauryl sulfate plus amide builder. The results of a typical analysis of Orvus K Liquid are as follows: 37.5% active alkyl sulfate; 9.0% alkanolamide; 1.2% unsulfated alcohol; 0.9% ammonium sulfate; 1.0% ammonium chloride; 20.0% denatured ethyl alcohol; with the remainder being water. (The foregoing percents represent weight percents.) The pH is approximately 6.3; the specific gravity, 25° C./4° C., is 0.98; and the density (lb/gal) is 8.2.

The surfactant, in addition to contributing electrical conductivity, also promotes uniform and complete wetting of the housing surface when the antistatic coating is applied.

The concentration of the deliquescent salt in the antistatic coating of the present invention is at least about 2 weight percent of the dry coating mixture. Preferably, the coating contains from about 2 to about 80 weight percent deliquescent salt, with the balance being anionic surfactant. Most preferably, the coating contains from about 2 to about 50 weight percent of the deliquescent salt.

The antistatic coating is applied to the multilamp photoflash device by such methods as, for example, spraying or wiping the exterior surface of the outer housing of the device with an antistat solution which contains the deliquescent salt and anionic surfactant dissolved in a solvent. For a solvent to be suitable for use in applying the coating to the housing surface, the anionic surfactant and deliquescent salt components of the coating must be soluble therein, and the solvent should be capable of being evaporated at temperatures from about room temperature to about 60° C. Examples of suitable solvents include water and lower alkyl alcohols. The concentration of the anionic surfactant in the solution which is applied to the surface of the outer housing is not critical. Preferably, the solution contains from about 0.1 to about 5 weight percent anionic surfactant. Similarly, the concentration of the deliquescent salt in the antistat solution is not highly critical. Preferably, the antistat solution contains an amount of deliquescent salt from about 0.1 weight percent to a weight percent approximately equal to the anionic surfactant weight used. Most preferably, the antistat solution contains about 1 weight percent anionic surfactant and about 0.5 weight percent deliquescent salt.

When the flashlamps of the device are coated with the antistatic coating in accordance with the preferred embodiment of the present invention, the antistatic coating is applied to the exterior surface of the flashlamps by, for example, dipping the flashlamps into the antistat solution and evaporating the solvent from the solution on the exterior surfaces of the flashlamps so as to form an antistatic coating on the outer surfaces of the individual flashlamps. The flashlamps are coated with the antistatic coating before the flashlamps are incorporated into, or positioned within, the multilamp photoflash device.

In applying the antistatic coating to the outer housing of the multilamp photoflash device, it is preferable to apply the antistatic coating to the surface of the outer housing after the device is fabricated. However, the piece or pieces used to construct the outer housing can alternatively be coated before the device is fabricated.

The following Table summarizes the results of a series of experiments conducted to compare the surface resistance of an untreated (i.e., having no coating) polybutadiene-styrene array cover with the surface resistance of polybutadiene-styrene array covers which had been treated with antistat solutions of various compositions. In one of the experiments the surface of the array cover was treated with a solution containing about 0.6 weight percent Orvus K Liquid in a water solvent. In a second experiment the surface of the array cover was treated with a solution containing about 0.6 weight percent Orvus K Liquid and about 1 weight percent glycerol in a water solvent. In a third experiment, the surface of the butadiene-styrene array cover was treated with a solution containing about 0.6 weight percent Orvus K Liquid and about 0.5 weight percent magnesium perchlorate in a water solvent. In each of the experiments, the surface resistance of the array cover was measured between points ⅜ inch apart in megohms. A megohmmeter with a 500 megohm range was used to take the surface resistance measurements. Each entry in the Table represents the average resistance measurement for 12 separate samples. Measurements were taken: (1) 16 hours after the cover was treated; (2) 48 hours after the cover was treated; and (3) 8 days after the cover was treated. The percent relative humidity at the time of each reading is also reported in the Table.

TABLE

| | | Surface wiped with 0.6% Orvus K in water: | |
| --- | --- | --- | --- |
| | Alone | 1% Glycerol Added | 0.5% Mg (ClO$_4$)$_2$ Added |
| (1) After 16 hours; 44% relative humidity | | | |
| Av. R, megohms | infinity* | 500 | 400 | 145 |
| R Range | — | — | — | (24–400) |

TABLE-continued

| | Surface wiped with 0.6% Orvus K in water: | | |
|---|---|---|---|
| | Alone | 1% Glycerol Added | 0.5% Mg (ClO4)2 Added |
| (2) After 48 hours; 45% relative humidity | | | |
| Av. R, megohms | infinity* | 295 | 41.5 | 9.2 |
| R range | | (70–500) | (8–300) | (4–22) |
| (3) After 8 days; 31% relative humidity | | | |
| Av. R, megohms | infinity* | infinity* | 500 | 50 |
| R range | — | — | — | (22–100) |

*A value of infinity signifies no needle deflection on a 500-megohm scale. Those samples showing much greater than 500 megohms gave perceptible needle deflection off the infinity mark of the meter.

The data clearly show the significant increase in conductivity obtained by coating the array cover with a mixture comprising an anionic surfactant and a deliquescent salt. Such increase in conductivity provides a means for discharging electrostatic charge thereby inhibiting and/or preventing electrostatic charge buildup in the device. The protection provided by the coating of the present invention may be insufficient to provide complete protection from premature flashing of a device in the event of contact between the device and a highly charged conductive object.

While there have been shown and described what are considered preferred embodiments of the present invention, it will be obvious to those skilled in he art that various changes and modifications may be made therein without departing from the invention as defined by the appended claims.

What is claimed is:

1. A multilamp photoflash device comprising an outer housing containing a plurality of flashlamps and means for sequentially flashing said flashlamps of the device; and an antistatic coating on the surface of said outer housing, said antistatic coating comprising an anionic surfactant and a deliquescent salt.

2. A multilamp photoflash device in accordance with claim 1 wherein the deliquescent salt is selected from the group consisting of alkaline earth perchlorates, alkaline earth halides, alkaline earth nitrates, alkali metal perchlorates, alkali metal formates, and mixtures thereof.

3. A multilamp photoflash device in accordance with claim 2 wherein the deliquescent salt is selected from the group consisting of magnesium perchlorate, calcium perchlorate, magnesium chloride, magnesium bromide, magnesium iodide, magnesium nitrate, calcium chloride, calcium bromide, calcium iodide, magnesium nitrate, sodium perchlorate, and sodium formate.

4. A multilamp photoflash device in accordance with claim 1 wherein the anionic surfactant comprises an alkyl sulfate.

5. A multilamp photoflash device in accordance with claim 4 wherein the anionic surfactant comprises sodium lauryl sulfate, ammonium lauryl sulfate, sodium stearate, sodium tetradecyl sulfate, or sodium polyoxyl ethylene alkylphenol sulfonate.

6. A multilamp photoflash device in accordance with claim 4 wherein the anionic surfactant further comprises amides, alcohols, ammonium salts, and moisture.

7. A multilamp photoflash device in accordance with claim 1 wherein the coating contains at least about 2 weight percent of the deliquescent salt.

8. A multilamp photoflash device in accordance with claim 1 wherein the coating contains from about 2 to about 80 weight percent of the deliquescent salt.

9. A multilamp photoflash device in accordance with claim 2 wherein the anionic surfactant comprises an alkyl sulfate.

10. A multilamp photoflash device in accordance with claim 9 wherein the anionic surfactant comprises sodium lauryl sulfate, ammonium lauryl sulfate, sodium stearate, sodium tetradecyl sulfate, or sodium polyoxyl ethylene alkylphenol sulfonate.

11. A multilamp photoflash device in accordance with claim 9 wherein the anionic surfactant further comprises amides, alcohols, ammonium salts, and water.

12. A multilamp photoflash device in accordance with claim 9 wherein the coating contains from about 2 to about 80 weight percent of the deliquescent salt.

13. A multilamp photoflash device in accordance with claim 11 wherein the coating contains from about 2 to about 50 weight percent of the deliquescent salt.

14. A multilamp photoflash device in accordance with claim 1 wherein the multilamp photoflash device contains no metallized reflectors.

15. A multilamp photoflash device in accordance with claim 1 wherein the exterior surface of at least one flashlamp is coated with said antistatic coating.

16. A multilamp photoflash device comprising an outer housing containing a plurality of flashlamps and means for sequentially flashing said flashlamps of the device; and an antistatic coating on the exterior surface of said outer housing, said antistatic coating comprising about 45 weight percent of a deliquescent salt comprising magnesium perchlorate and about 55 weight percent of an anionic surfactant comprising Orvus K Liquid.

17. A multilamp photoflash device in accordance with claim 16 wherein the exterior surface of each flashlamp is coated with said antistatic coating.

18. A method for inhibiting electrostatic charge buildup in a multilamp photoflash device comprising an outer housing containing a plurality of flashlamps and means for sequentially flashing the flashlamps of the device, said method comprising applying an antistat solution comprising an anionic surfactant and a deliquescent salt dissolved in a solvent to the surface of said outer housing of said multilamp photoflash device; and evaporating said solvent from said antistat solution on said surface of said outer housing so as to form an antistatic coating thereon, said antistatic coating comprising the anionic surfactant and deliquescent salt components of said antistat solution.

19. A method in accordance with claim 18 wherein said antistat solution comprises from about 0.1 to about 5 weight percent of said anionic surfactant and from about 0.1 to about 5 weight percent of said deliquescent salt dissolved in said solvent.

20. A method in accordance with claim 19 wherein said antistat solution comprises about 1 weight percent anionic surfactant and about 0.5 weight percent deliquescent dissolved in said solvent.

21. A method in accordance with claim 18 wherein said antistat solution is applied to said outer housing by spraying or wiping the solution onto the exterior surface of said outer housing.

22. A method for inhibiting electrostatic charge buildup in a multilamp photoflash device comprising an outer housing containing a plurality of flashlamps and means for sequentially flashing the flashlamps of the device, said method comprising applying an antistat solution comprising about 0.6 weight percent of an an anionic surfactant comprising Orvus K Liquid and about 0.5 weight percent of a deliquescent salt comprising magnesium perchlorate dissolved in a water solvent to the surface of said outer housing of said multilamp photoflash device; and evaporating said water solvent from said antistat solution on said surface of said outer housing so as to form an antistatic coating thereon, said antistatic coating comprising the Orvus K Liquid anionic surfactant and the magnesium perchlorate deliquescent salt components of said antistat solution.

23. A method in accordance with claim 22 wherein said multilamp photoflash device contains no metallized reflectors.

24. A method for inhibiting electrostatic charge buildup in a multilamp photoflash device comprising an outer housing containing a plurality of flashlamps and means for sequentially flashing the flashlamps of the device, said method comprising applying an antistat solution comprising an anionic surfactant and a deliquescent salt dissolved in a solvent to the exterior surface of at least one flashlamp; evaporating said solvent from said antistat solution on the surface of the flashlamp so as to form a flashlamp having an antistatic coating thereon, said antistatic coating comprising the anionic surfactant and deliquescent salt components of said antistat solution; incorporating a plurality of flashlamps into said multilamp photoflash device, at least one of said flashlamps having an antistatic coating thereon; applying said antistat solution to the surface of said outer housing of said multilamp photoflash device; and evaporating said solvent from said antistat solution on said surface of said outer housing so as to form an antistatic coating thereon; said antistatic coating comprising the anionic surfactant and deliquescent salt components of said antistat solution.

* * * * *